United States Patent [19]

Freedman

[11] 3,818,242

[45] June 18, 1974

[54] HIGH-SPEED LOGIC CIRCUITS

[75] Inventor: David Daniel Freedman, Cinnaminson, N.J.

[73] Assignee: RCA Corporation, New York, N.Y.

[22] Filed: Aug. 7, 1972

[21] Appl. No.: 278,271

Related U.S. Application Data

[63] Continuation of Ser. No. 200,796, Nov. 22, 1971, abandoned.

[52] U.S. Cl. .................. 307/218, 307/208, 307/221, 307/239, 307/247 A

[51] Int. Cl. .......................................... H03k 19/22

[58] Field of Search ....... 307/247 A, 239, 269, 221, 307/218, 208

[56] References Cited

UNITED STATES PATENTS

| | | | |
|---|---|---|---|
| 3,040,192 | 6/1962 | Slobodzinski | 307/88.5 |
| 3,156,870 | 11/1964 | Nixon | 328/45 |
| 3,316,503 | 4/1967 | Lenz | 332/16 |
| 3,327,226 | 6/1967 | Nourney | 328/109 |
| 3,349,332 | 10/1967 | Bleickardt | 328/42 |
| 3,458,825 | 1/1969 | Lagemann | 328/206 |
| 3,598,908 | 8/1971 | Poolett | 178/6 |
| 3,617,903 | 11/1971 | Trolio | 328/94 |
| 3,681,616 | 8/1972 | Mori et al. | 307/218 |

OTHER PUBLICATIONS

Motorola, "The Integrated Circuit Data Book," First Ed., (Aug. 1968), p. 2-80, 2-89, and 2-92.

*Primary Examiner*—Rudolph V. Rolinec
*Assistant Examiner*—Joseph E. Lawson, Jr.
*Attorney, Agent, or Firm*—Carl M. Wright

[57] ABSTRACT

A high-speed logic circuit for use in a pseudo random code generator which is capable of operating at high speed. Rather than including a gate such as an EXCLUSIVE OR or EXCLUSIVE NOR gate the feedback loop of a shift register, the same function is performed by phantom OR gates in the feedback loop and register and one or more additional logic stages. The phantom OR gates introduce essentially no delay as compared with EXCLUSIVE OR or EXCLUSIVE NOR gates, and each additional logic stage (which may be a flip-flop or the like) operates concurrently with a register storage stage and also introduces no added delay.

13 Claims, 6 Drawing Figures

HIGH-SPEED LOGIC CIRCUITS

This is a continuation of application Ser. No. 200,796, filed Nov. 22, 1971, now abandoned.

BACKGROUND OF THE INVENTION

There are many fields, for example, in digital communications where it is useful to produce sequences of binary 1's and 0's. One way this can be done is with a shift register having N stages controlled by a clock pulse source and which includes a feedback circuit. At each clock pulse, the information (1 or 0) stored at each stage is shifted to the following stage, and the feedback circuit supplies new information to the first stage.

In one particularly useful system, the outputs from specific individual stages of the shift register are summed by modulo-2 adders (also known as exclusive-OR gates, anti-coincidence gates, or half adders) and the resulting signal is fed back to the input stage of the register. The number of shift register stages and the feedback connections determine the output sequence. Feedback connections for specific codes, including pseudorandom codes, are well known in the art and may be found in such works as W. W. Peterson, "Error-Correcting Codes," The MIT Press, Cambridge, Massachusetts, 1961; and Solomon W. Golomb, "Shift Register Sequences," Holden-Day, Inc.; San Francisco, California, 1967.

In the prior art, even the simplest modulo-2 adders are constructed using various combinations of logic gates such as, AND, OR, and NOT gates (see, for example, Elwyn R. Berlekamp, "Algebraic Coding Theory," Mc Graw-Hill Book Company, 1970, p. 31). These prior art modulo-2 adders introduce time delays. When used in the manner discussed above—in the feedback loop of a generator of sequential pulses—these circuits limit the generator's operating speed, the maximum rate at which pulses can be produced.

SUMMARY OF THE INVENTION

A logic circuit having first and second logical sum gates and means for applying one group of signals to one of the gates and complements of this group of signals or a second group of signals to the other of said gates. Means are provided for producing complements of the outputs of the first and second gates. A third logical sum gate is receptive of the complements of the output signals of said first and second gates. The circuit is especially useful in sequential pulse generators such as pseudo-random code generators.

DETAILED DESCRIPTION

Figure 1:
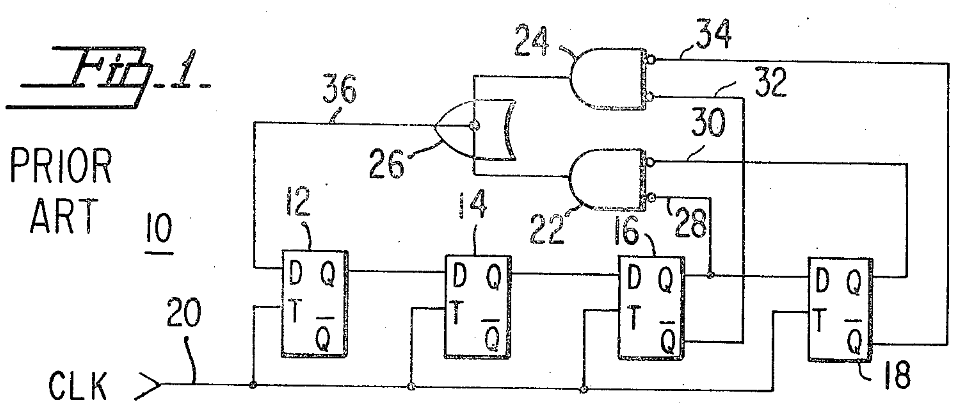
FIG. 1 is a block diagram illustrating a known four-stage shift register employing a modulo-2 feedback path in accordance with the prior art.

FIG. 1 shows a prior art four-stage shift register arranged as a sequence generator. A feedback path is taken from the third and fourth flip-flop stages and fed back to the first stage of the shift register. The shift register shown generally at 10 includes four D type flip-flop stages 12, 14, 16 and 18. The Q output terminal of each flip-flop except 18, is coupled to the D input terminal of the following flip-flop. The triggering or clocking input to each stage is provided by clock line 20 which is, in turn, fed by a clock source CLK. The modulo-2 adder comprises NOR gates 22 and 24, and phantom-OR gate 26. The Q output of flip-flop 16 is connected to the first input of NOR gate 22 by way of lead 28. The Q output of flip-flop stage 18 is connected to the second input of NOR gate 22 by way of lead 30. A complementary output $\overline{Q}$ of flip-flop stage 16 is coupled to the first input of NOR gate 24 by way of lead 32. The complementary output $\overline{Q}$ of flip-flop stage 18 is coupled to the second input of NOR gate 24 by way of lead 34. The outputs of NOR gates 22 and 24 are coupled to the inputs of phantom-OR gate 26. The output of gate 26 is coupled to the D input of flip-flop stage 12 by way of lead 36.

The operation of NOR gates 22 and 24 is described as follows. With a logic 0 applied to both inputs of either NOR gate, its output will be a logic 1. With any other combination of logic 1's and 0's at the inputs of either NOR gate, its output will be a logic 0. The operation of phantom-OR gate 26 is such that its output will be a logic 1 if a logic 1 is presented to one or both of its inputs. If a logic 0 is presented to both inputs of phantom-OR gate 26 simultaneously, its output will be a logic 0.

As known in the art a phantom-OR (also known as implicit or wired-OR) gate function is generally obtained by directly coupling together the outputs of two or more logic elements. This phantom-OR capability is inherent to the output circuitry of appropriately chosen logic elements. That is, the output circuits of the logic elements must be of the type which permit direct or hardwire coupling without inhibiting the internal operation of the logic element and such that the combined outputs will OR in response to one logic input level and AND in response to a second logic input level.

Assuming initially that the Q outputs of flip-flop stages 12, 14, 16 and 18 are at logic 0, the operation of shift register 10 is as follows. The Q outputs of flip-flop stages 16 and 18 will present a logic 0 to both inputs of NOR gate 22. The complementary or $\overline{Q}$ outputs of flip-flop stages 16 and 18 will present a logic 1 to both inputs of NOR gate 24. In this case, the output of NOR gate 22 will be a logic 1 and the output of NOR gate 24 will be a logic 0; therefore, the output of phantom-OR gate 26 will be a logic 1. After the first clocking pulse applied to shift register 10 on clock line 20, the input of each flip-flop stage will appear at its Q output. Thus, the Q output of flip-flop stage 12 will be a logic 1 and the Q output of flip-flop stages 14, 16 and 18 will be a logic 0. Accordingly, the output of phantom-OR gate 26 will remain a logic 1. After the second clock pulse flip-flop stages 12 and 14 will exhibit a logic 1 at their Q outputs. The Q outputs of flip-flop stages 16 and 18 will again be a logic 0. After the third clock pulse, the Q outputs of flip-flops 12, 14 and 16 will be a logic 1 and the Q output of flip-flop 18 will be a logic 0. At this time the output of NOR gate 22 will be a logic 0 and the output of NOR gate 24 will likewise be a logic 0. Therefore, the output of phantom-OR gate 26 will be a logic 0. After the fourth clock pulse, the logic 0 that appeared at the input of flip-flop 12 will appear at its Q output. The Q outputs of flip-flops 14, 16 and 18 at this time will be a logic 1. The output of phantom-OR gate 26 will therefore be a logic 1.

The above-described operation and the operation of shift register 10 for 15 consecutive clock periods is depicted in Table 1 below.

TABLE 1

| Clock Pulse | Flip-flop 12 | Flip-flop 14 | Flip-flop 16 | Flip-flop 18 |
|---|---|---|---|---|
| Initial State | 0 | 0 | 0 | 0 |
| 1 | 1 | 0 | 0 | 0 |
| 2 | 1 | 1 | 0 | 0 |
| 3 | 1 | 1 | 1 | 0 |
| 4 | 0 | 1 | 1 | 1 |
| 5 | 1 | 0 | 1 | 1 |
| 6 | 1 | 1 | 0 | 1 |
| 7 | 0 | 1 | 1 | 0 |
| 8 | 0 | 0 | 1 | 1 |
| 9 | 1 | 0 | 0 | 1 |
| 10 | 0 | 1 | 0 | 0 |
| 11 | 1 | 0 | 1 | 0 |
| 12 | 0 | 1 | 0 | 1 |
| 13 | 0 | 0 | 1 | 0 |
| 14 | 0 | 0 | 0 | 1 |
| 15 | 0 | 0 | 0 | 0 |

It should be appreciated that NOR gates 22 and 24 will introduce a gate delay before the inputs on leads 28, 30, 32 and 34 can effect a change in logic levels at the respective NOR gate outputs. Accordingly, the maximum clocking rate must be delayed or reduced in order to permit the input signals at NOR gates 22 and 24 to effect a change at the output of phantom-OR gate 26. It follows that the speed of operation or clocking rate of shift register 10 is not merely limited by the basic switching speeds of the flip-flop stages, but is additionally limited by the time delay of NOR gates 22 and 24.

Figures 2, 3:
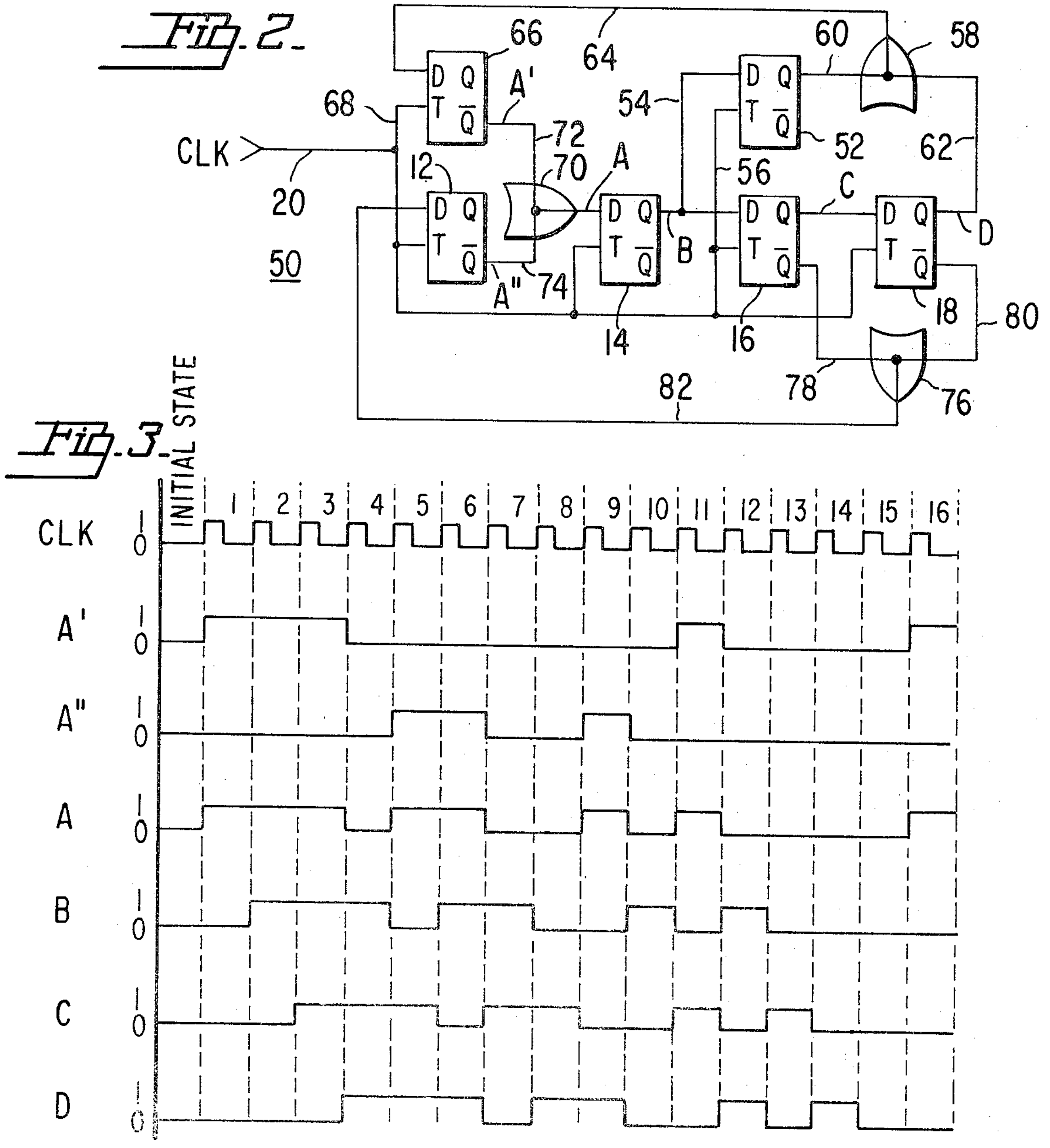
FIG. 2 is a block diagram illustrating a shift register sequence generator in accordance with the principle of the present invention.
FIG. 3 is a timing diagram illustrating the signal waveforms associated with the operation of the shift register illustrated in FIG. 2.

Referring now to FIG. 2, there is shown a block diagram of a four-stage shift register in accordance with the principle of the present invention. In FIG. 2 there is shown generally at 50 a shift register wherein like elements bear like reference numerals. An additional D type flip-flop 52 has its input connected to the Q output of flip-flop 14 by way of lead 54. The clock input to flip-flop 52 is connected to the clock line 20 by way of lead 56. The Q output of flip-flop 52 is connected to a first input of phantom-OR gate 58 by way of lead 60. The Q output of flip-flop 18 is connected to the second input of OR gate 58 by way of lead 62. The output of OR gate 58 is connected by way of lead 64 to the input of a second additional flip-flop 66. The clocking input of flip-flop 66 is connected to clock line 20 by way of lead 68 and the $\overline{Q}$ output of flip-flop 66 is connected to phantom-OR gate 70 by way of lead 72. The $\overline{Q}$ output of flip-flop 12 is connected to the second input of phantom-OR gate 70 by way of lead 74. The first input of phantom-OR gate 76 is connected to the $\overline{Q}$ output of flip-flop 16 by way of lead 78. The second input of OR gate 76 is connected to the $\overline{Q}$ output of flip-flop 18 by way of lead 80. The output of OR gate 76 is coupled to the input of flip-flop 12 by way of lead 82.

The operation of phatnom-OR gates 58, 70 and 76 is as follows. With a logic 1 presented to either input of any phantom-OR gate, the output of the OR gate will be a logic 1. With a logic 0 applied to both inputs of any phantom-OR gate, the output of the OR gate will be a logic 0.

The operation of shift register 50 will be more clearly understood by reference to the waveforms of FIG. 3. The output of the first shift register stage will be taken as the output of phantom-OR gate 70. The output of phantom-OR gate 70, depicted as A in FIGS. 2 and 3, is determined by the $\overline{Q}$ outputs of flip-flops 66 and 12 which are depicted as A′ and A″ respectively. It should be noted that since the $\overline{Q}$ outputs of flip-flops 66 and 12 are coupled together, the individual signals at A′ and A″ cannot be separately observed or distinguished from one another. Instead, the detectable signal at either flip-flop $\overline{Q}$ output in this configuration is signal A which will be a logic 1 if either $\overline{Q}$ output is a logic 1 and a logic 0 when both $\overline{Q}$ outputs are a logic 0. However, for clarity both A′ and A″, representing the internal states of flip-flops 66 and 12, are separately shown in FIG. 3.

Assuming that the output of each shift register stages, at A, B, C and D in FIGS. 2 and 3, is initially a logic 0, the operation is as follows. The outputs of flip-flops 52 and 16 as well as flip-flop 18 will be a logic 0 at their Q outputs and a logic 1 at their respective $\overline{Q}$ outputs. Accordingly, the inputs to phantom-OR gate 58 will effect a logic 0 at its output. Similarly, the inputs to phantom-OR gate 76 will be a logic 1; therefore, its output will be a logic 1.

After the first clock pulse, the $\overline{Q}$ output of flip-flop 66 at A′ will be a logic 1, and the $\overline{Q}$ output of flip-flop 12 at A″ will be a logic 0. The output of phantom-OR gate 70 at A will therefore be a logic 1. The Q outputs of flip-flops 14, 16 and 18 at B, C and D, will remain a logic 0. Accordingly, the outputs of phantom-OR gates 58 and 76 will remain a logic 0 and logic 1 respectively. After the second clock pulse, the flip-flop outputs at A′ and A″ will be a logic 1 and logic 0, respectively. The output of phantom-OR gate 70 at A will remain a logic 1. The flip-flop output at B will now be a logic 1, whereas the outputs at C and D will remain logic 0's. After the third clock pulse, the outputs at A, B and C will be a logic 1 whereas the output at D will remain a logic 0.

At this time the inputs to phantom-OR gate 58 will be a logic 1 and a logic 0; the output of phantom-OR gate 58 will be a logic 1. Similarly, the inputs to phantom-OR gate 76 will be a logic 1 and a logic 0; therefore, the output of phantom-OR gate 76 will be a logic 1. Thus, after the fourth clock pulse the outputs at A′ and A″ will be a logic 0; and therefore, the output A of phantom-OR gate 70 will likewise be a logic 0. The outputs at B, C and D will be logic 1's.

At this time the outputs of flip-flops 52 and 16 as well as flip-flop 18 will be a logic 1 at their Q outputs and a logic 0 at their respective $\overline{Q}$ outputs. Accordingly, the inputs to phantom-OR gate 58 will effect a logic 1 at its output, and the inputs to phantom-OR gate 76 will effect a logic 0 at its output. Thus, after the fifth clock pulse the output at A′ will be a logic 0 and the output at A″ will be a logic 1. The output at A will therefore be a logic 1 and the outputs at B, C and D will be a logic 0, 1 and 1 respectively.

The above-described operation and the operation of shift register 50 for 15 consecutive clock pulses is depicted in Table 2 below.

TABLE 2

| Clock Pulse | A' | A'' | A | B | C | D |
|---|---|---|---|---|---|---|
| Initial State | 0 | 0 | 0 | 0 | 0 | 0 |
| 1 | 1 | 0 | 1 | 0 | 0 | 0 |
| 2 | 1 | 0 | 1 | 1 | 0 | 0 |
| 3 | 1 | 0 | 1 | 1 | 1 | 0 |
| 4 | 0 | 0 | 0 | 1 | 1 | 1 |
| 5 | 0 | 1 | 1 | 0 | 1 | 1 |
| 6 | 0 | 1 | 1 | 1 | 0 | 1 |
| 7 | 0 | 0 | 0 | 1 | 1 | 0 |
| 8 | 0 | 0 | 0 | 0 | 1 | 1 |
| 9 | 0 | 1 | 1 | 0 | 0 | 1 |
| 10 | 0 | 0 | 0 | 1 | 0 | 0 |
| 11 | 1 | 0 | 1 | 0 | 1 | 0 |
| 12 | 0 | 0 | 0 | 1 | 0 | 1 |
| 13 | 0 | 0 | 0 | 0 | 1 | 0 |
| 14 | 0 | 0 | 0 | 0 | 0 | 1 |
| 15 | 0 | 0 | 0 | 0 | 0 | 0 |

It may be observed that Table 2 agrees with Table 1 when the outputs A, B, C and D are taken as the outputs of flip-flop stages 12, 14, 16 and 18 of shift register 10 in FIG. 1. It can be seen that the modulo-2 feedback circuit of FIG. 2—comprising phantom-OR gates 58, 76 and 70 and further comprising means for complementing the outputs of the phantom-OR gates 58 and 76—introduces no gate time delay. That is, the desired combination of feedback signals from given stages are presented to the input terminals of selected input stages without the attending time delay characteristic of the prior art. Further, the resultant output of the selected input stage is immediately available following the next clock pulse, again, without introducing a time delay.

Referring again to the operation of shift register 50 in FIG. 2, it is clear that the output sequence at any given stage repeats itself after 15 clock pulses. Also, it should be noted that the function generated by the modulo-2 adder, expressed in Boolean algebra, is $\overline{C}\overline{D} + CD$. This function determines the output of phantom-OR gate 70 at A after each clock pulse. It should be further noted, however, that the function generated here, again $\overline{C}\overline{D} + CD$, is not the only function possible. For example, by reversing the Q and $\overline{Q}$ connections at the outputs of flip-flop 16 or 18, the complementary function $\overline{C}D+C\overline{D}$ is obtained. This funtion may be considered, by some practitioners, the more standard function, as it makes the all logic 1's initial condition an acceptable sequence pattern. Whereas the all 1's initial condition in FIG. 2 is unacceptable as the shift register would then lock up, continuously generating all 1's at any fixed stage.

Figure 4:
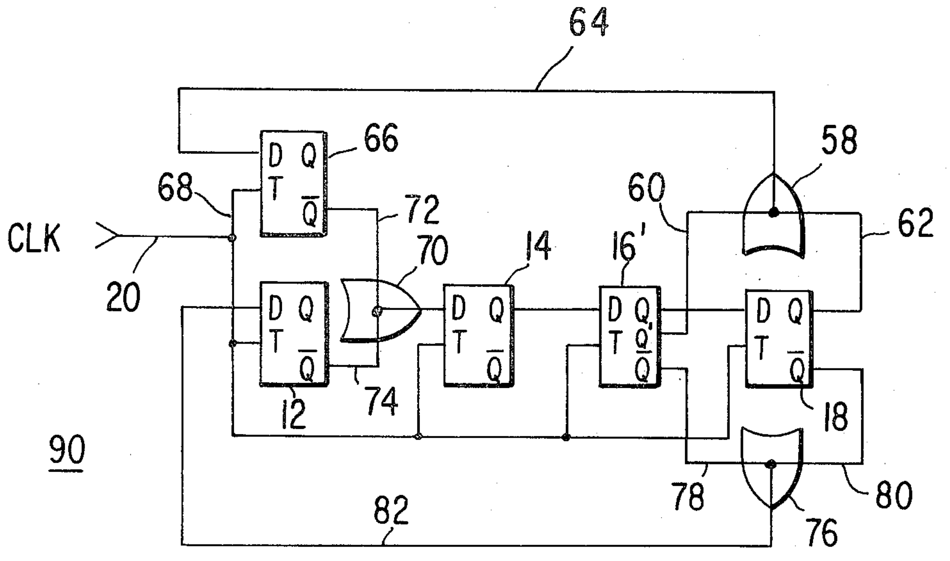
FIG. 4 is a block diagram of an alternative embodiment of the present invention.

Referring now to FIG. 4, there is shown a block diagram of an alternative embodiment of the present invention. In FIG. 4 there is shown generally at 90 a shift register, wherein like elements bear like reference numerals, which is functionally identical to the shift register 50 of FIG. 2. In this embodiment, a flip-flop circuit has been eliminated by providing a second Q output designated Q' at the output of flip-flop 16'. The Q and Q' outputs of flip-flop 16' provide identical output functions which are, however, electrically isolated from one another. The isolated outputs are required so as to avoid directly connecting the input of flip-flop 18 to its output when the outputs of flip-flops 16 and 18 are phantom-OR'ed together. It can be seen that the operation and function of shift register 90 in FIG. 4 is otherwise identical to shift register 50 of FIG. 2. The advantage of shift register 90 resides in a reduced load on the clock line 20 as well as the elimination of flip-flop circuitry. Similarly, the same advantages can be obtained by providing a flip-flop stage with two electrically isolated D inputs. In this case, the outputs of two given (single Q output) shift register stages are phantom-OR'ed at the dual inputs of the modified flip-flop circuit replacing flip-flop 66 in FIG. 4.

Figure 5:
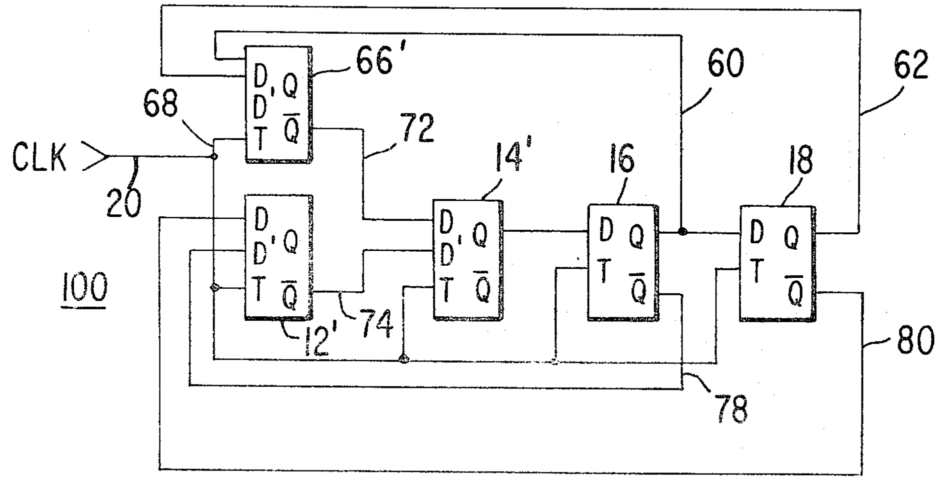
FIG. 5 is a block diagram of another alternative embodiment of the present invention.

In FIG. 5 there is shown another alternative embodiment of the present invention. The shift register 100 is functionally identical to the shift register 50 of FIG. 3. and like elements bear like reference numerals. Flip-flop stages 12', 14' and 66' are provided with two electrically isolated inputs designated D and D' respectively. In this embodiment, the Q outputs of flip-flops 18 and 16 at leads 62 and 60 are connected to the D and D' inputs, respectively, of flip-flop 66'; and the $\overline{Q}$ outputs at leads 80 and 78 are connected to the D and D' inputs respectively of flip-flop 12'. The $\overline{Q}$ outputs of flip-flops 66' and 12' at leads 72 and 74 are connected to the D and D' inputs, respectively, of flip-flop 14'.

These dual inputs may take the form of two input transistors, for example, having a common or parallel output circuit point at each flip-flop input. In the same manner, the separate transistor input electrodes provide electrically isolated input terminals and the phantom-OR gate function, as described hereinbefore, is obtained at the common output circuit point. It should be noted that the dual input terminals need not be provided by a separate input stage preceding the flip-flop input but may be provided by a second input transistor whose output is coupled in parallel with the normally present input transistor.

In addition to a reduced load on the clock line and the elimination of flip-flop circuitry, the embodiment shown in FIG. 5 has the advantage that the circuit can be constructed using logic elements whose outputs are not usually coupled together to obtain the phantom-OR gate function. For example, the outputs of CMOS and TTL logic elements cannot be directly coupled together; however, a high-speed logic circuit, in acocrdance with the principle of the present invention, can be constructed using these logic families in the manner shown in FIG. 5. Further advantages of this embodiment are the reduced capacitance loading on the $\overline{Q}$ outputs of flip-flops 12' and 66' and that the $\overline{Q}$ outputs of flip-flops 12' and 66' are separately available as output terminals.

It should be noted that the high-speed logic circuit of the present invention is not limited to a sequence generator comprising a shift register having four stages. Additionally, the modulo-2 logic circuit function is applicable to shift registers having any number of stages. Further, the shift register sequence generator may employ multiple modulo-2 feedback paths, in accordance with the principle of the present invention, to achieve the desired sequence or code. Moreover, the high-speed logic circuit of the present invention is, indeed, not limited in application to feedback loops for sequence generators, but is also useful in other circuit applications where modulo-2 addition is employed.

The other circuit applications include those situations where the signals which are to be applied to the high-speed logic circuit are available immediately after a first event (such as, a clock pulse period) and where the logic function is required immediately after a second event or clock pulse period.

These situations are commonly found in digital signal processing techniques such as Analog-to-Digital conversion. Here the conversion technique is to convert a linearly quantized voltage range to an equivalent binary code; a common method is to convert to a Gray code first and then convert the Gray code to the conventional binary code. The logic circuitry required to accomplish this conversion comprises modulo-2 adders and a network of serially connected flip-flop stages which are clocked together in order to obtain the binary code. Similar situations are to be found in shift registers used to perform digital data parity checks.

What has been shown, then, is a high-speed logic circuit performing modulo-2 addition and having no gate or time delay attributable to the modulo-2 function. As described above, the circuit is particularly suitable for use in shift register sequence generators in order to provide modulo-2 addition without introducing additional time delay, thereby permitting the sequence generator to operate at the maximum clocking rate of the shift register stages.

Figure 6:
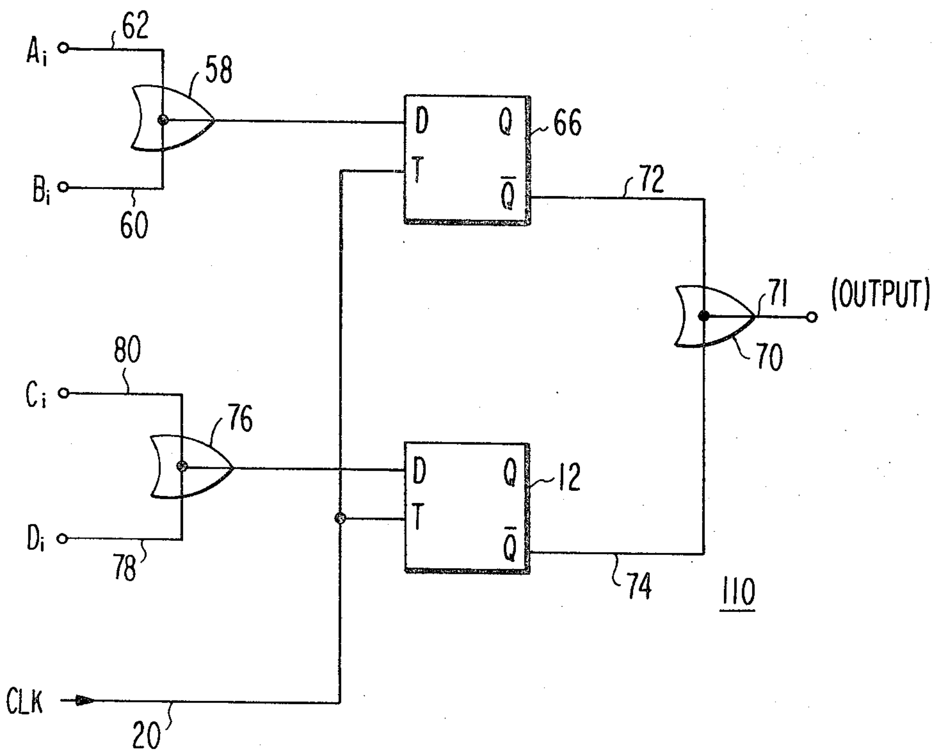
FIG. 6 is a block diagram of a generalized form of the logic circuit in accordance with the present invention.

Thus, it should now be appreciated that the logic circuit of the present invention is useful in a variety of applications where signals representing various combinations of binary digits are applied to the input gates in order to perform a desired logic function. Referring now to FIG. 6, wherein like elements, with respect to the previous figures, bear like reference numerals, there is shown at 110 a generalized schematic representation of the logic circuit of the present invention. The signals present at input leads 62 and 60 of phantom-OR gate 58 are designated as $A_i$ and $B_i$, respectively. Similarly, the signals present at input leads 80 and 78 of phantom-OR gate 76 are designated as $C_i$ and $D_i$, respectively. The output of phantom-OR gate 70 is taken from output lead 71.

The output signal state of the logic circuit of FIG. 6, corresponding to various combinations of binary digit input signals, is depicted in Table 3 below. It should be noted that the output signal of the logic circuit, which is determined by the state of the input signals preceding each clock pulse period, is available immediately after each clock pulse period.

TABLE 3

| | Input Signal State | | | | Logic Circuit Output Signal State |
|---|---|---|---|---|---|
| | $A_i$ | $B_i$ | $C_i$ | $D_i$ | Output |
| 1. | 0 | 0 | 0 | 0 | 1 |
| 2. | 0 | 0 | 0 | 1 | 1 |
| 3. | 0 | 0 | 1 | 1 | 1 |
| 4. | 0 | 0 | 1 | 0 | 1 |
| 5. | 0 | 1 | 1 | 0 | 0 |
| 6. | 0 | 1 | 1 | 1 | 0 |
| 7. | 0 | 1 | 0 | 1 | 0 |
| 8. | 0 | 1 | 0 | 0 | 1 |
| 9. | 1 | 0 | 0 | 0 | 1 |
| 10. | 1 | 0 | 0 | 1 | 0 |
| 11. | 1 | 0 | 1 | 1 | 0 |
| 12. | 1 | 0 | 1 | 0 | 0 |
| 13. | 1 | 1 | 1 | 0 | 0 |
| 14. | 1 | 1 | 1 | 1 | 0 |
| 15. | 1 | 1 | 0 | 1 | 0 |
| 16. | 1 | 1 | 0 | 0 | 1 |

As mentioned above the outputs of phantom-OR gates in general, provide an OR logic function in response to a first logic input level and provide an AND logic function in response to a second logic input level. As shown above, the output state of the various phantom-OR gates will be a logic 1 whenever a logic 1 is applied to any input of the gate; and a logic 0 only when a logic 0 is applied to all inputs of the gate. Accordingly, it should also be appreciated that the phantom-OR input gates of the present invention, such as phantom-OR gates 58 and 76, may each comprise a phantom-OR gate having a single input or a multiple of inputs. Therefore, the operation of the logic circuit of the present invention may also be described by a simplified truth table wherein only the resulting outputs of the phantom-OR gates are considered. Thus, the output signal state of the logic circuit of FIG. 6, corresponding to the four output combinations of the phantom-OR gates 58 and 76, is depicted in Table 4 below.

Table 4 depicts the operation of the logic circuit of the present invention irrespective of any particular number of input signals applied to the respective phantom-OR input gates 58 and 76. It is noted, again, that the output signal of the logic circuit, which is determined by the state of the input signals (at 71) preceding each clock pulse period, is available immediately after each clock pulse period.

TABLE 4

| Gate 58 Output | Gate 76 Output | Logic Circuit Output |
|---|---|---|
| 1 | 1 | 0 |
| 1 | 0 | 1 |
| 0 | 1 | 1 |
| 0 | 0 | 1 |

It is understood that the output of the phantom-OR output gate of the present invention, such as, phantom-OR gate 70, can also be phantom-OR'ed with output signals provided by the output gates of other similar logic circuits.

It should thus be appreciated that according to the teachings of the present invention a logic circuit is provided comprising a pair of bistable memory devices which are under the control of a clock or other type of gating control and are coupled to phantom (implicit or wired-OR) logic input elements and a phantom logic output element, thereby providing for a substantially instantaneous output function at the phantom output element in response to one or more logical inputs coupled to the input of each device by way of the phantom input elements.

What is claimed is:

1. A logic circuit comprising:

a flip-flop having a signal input, a complementary output and a clock input for receiving successive clock signals;

a phantom-OR gate having at least first and second inputs and an output, said output of said gate being coupled to said input of said flip-flop;

means for applying logical signals to said phantom-OR gate inputs immediately after the clock signal period of a first one of said successive clock signals; and, utilization means coupled to said complementary output of said flip-flop and responsive to said successive clock signals, for utilizing the complement of the output signal of said gate immediately after the clock signal period of the next-succeeding clock signal, whereby the resultant logic function of said logic circuit is available immediately after said next-succeeding clock signal and the minimum period of each of said successive clock signals can be equal solely to the delay of said flip-flop.

2. The logic circuit according to claim 1, in which signals representative of A and B are respectively applied to said first and second inputs of said phantom-OR gate, whereby the output signal of said gate is representative of A+B and the resultant logic function of said logic circuit is a signal representative of $\bar{A}\cdot\bar{B}$.

3. The logic circuit according to claim 1, wherein said first and second inputs of paid phantom-OR gate are electrically isolated from each other.

4. The logic circuit according to claim 1, wherein said utilization means includes a phantom-OR gate having an input coupled to said complementary output of said flip-flop.

5. A code generator, comprising:

a shift register including at least first, second and third flip-flops each having a signal input, a clock input and at least one output, each flip-flop in said shift register having an output coupled to the signal input of a following flip-flop; and, a modulo-2 feedback logic circuit including a further flip-flop having a complement output coupled together with said output of said first flip-flop to the signal input of said second flip-flop, said output of said first phantom-OR flip-flop being a complement output, first means for coupling one output of said third flip-flop and one output of another of said flip-flops other than said first and further flip-flops to the signal input of said further flip-flop, and second phantom-OR means for coupling a second output of said third flip-flop and a second output of said another flip-flop to the signal input of said first flip-flop.

6. The code generator according to claim 5 wherein said first and second phantom-OR means have first and second inputs respectively coupled to the isolated outputs of said third flip-flop and said another flip-flop, and each of said phantom-OR gates having an output respectively coupled to said signal input of said first flip-flop and said further flip-flop.

7. The code generator according to claim 5, wherein said second flip-flop includes first and second electrically isolated input terminals respectively coupled to the complement outputs of said further flip-flop and said first flip-flop.

8. A logic circuit comprising, in combination:

a first and second flip-flop, each flip-flop having an input, a complement output and a clock input for receiving successive clock signals;

first and second phantom-OR gates each gate having first and second inputs and output, said output of said first gate being coupled to said input of said first flip-flop and said output of said second gate being coupled to said input of said second flip-flop;

means for applying logical input signals to said first and second phantom-OR gates immediately after the clock signal period of a first one of said successive clock signals; and, utilization means including a third phantom-OR gate having first and second inputs respectively coupled to said complement outputs of said first and second flip-flops, said utilization means being responsive to said successive clock signals for utilizing the complements of the output signals of said first and second gates immediately after the clock signal period of the next-succeeding clock signal, whereby the resultant logic function of said logic circuit is available immediately after said next-succeeding clock signal and the minimum period of each of said successive clock signals can be equal solely to the delay of said flip-flops.

9. The logic circuit according to claim 8, wherein said third phantom-OR gate comprises a third flip-flop having first and second electrically isolated input terminals corresponding to said first and second inputs of said third phantom-OR gate.

10. The logic circuit in accordance with claim 8, wherein said means for applying signals to said phantom-OR gates includes means for applying one group of signals to said first gate and complements of these signals to said second gate.

11. A method for obtaining a resultant logic function represented by $\bar{A}\cdot\bar{B}$ from input signals represented by A and B, wherein said input signals are available immediately after the clock signal period of a first one of consecutive clock signals and said resultant logic function is required immediately after the clock signal period of the next-succeeding clock signal, said method comprising the steps of:

applying said input signals to respective inputs of a phantom-OR gate, whose output is coupled to the input of a flip-flop, in response to and immediately after said clock signal period of said first clock signal;

applying said next-succeeding clock signal to a clocking input of said flip-flop;

deriving said resultant logic function from a complement output of said flip-flop; and utilizing said derived resultant function immediately after said clock signal period of said next-succeeding clock signal, whereby the minimum period of each of said successive clock signals can be equal solely to the delay of said flip-flop.

12. The logic circuit according to claim 1, wherein said means for applying signals to said phantom-OR gate is responsive to said successive clock signals.

13. The logic circuit according to claim 8, wherein said means for applying input signals to said first and second phantom-OR gates is responsive to said successive clock signals.

* * * * *